(12) United States Patent
Benevelli et al.

(10) Patent No.: US 12,523,000 B2
(45) Date of Patent: Jan. 13, 2026

(54) SYSTEM AND METHOD FOR MAINTAINING LOADER ARM POSITION DURING THE OPERATION OF A WORK VEHICLE USING A RIDE CONTROL MODE

(71) Applicant: CNH Industrial America LLC, New Holland, PA (US)

(72) Inventors: Alessandro Benevelli, Reggio Nell'Emilia (IT); Craig Berard, West Fargo, ND (US); Andrea Vacca, West Lafayette, IN (US); Riccardo Madau, Turin (IT)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 321 days.

(21) Appl. No.: 18/015,624

(22) PCT Filed: Jul. 19, 2021

(86) PCT No.: PCT/US2021/042197
§ 371 (c)(1),
(2) Date: Jan. 11, 2023

(87) PCT Pub. No.: WO2022/016146
PCT Pub. Date: Jan. 20, 2022

(65) Prior Publication Data
US 2023/0250609 A1  Aug. 10, 2023

Related U.S. Application Data

(60) Provisional application No. 63/053,030, filed on Jul. 17, 2020.

(51) Int. Cl.
*E02F 3/43*  (2006.01)
*E02F 3/42*  (2006.01)
(Continued)

(52) U.S. Cl.
CPC .............. *E02F 3/432* (2013.01); *E02F 3/422* (2013.01); *E02F 9/2203* (2013.01);
(Continued)

(58) Field of Classification Search
CPC ......... E02F 3/432; E02F 3/422; E02F 9/2203; E02F 9/2267; E02F 9/2271; E02F 9/2285; E02F 9/2296; F15B 13/042
(Continued)

(56) References Cited

U.S. PATENT DOCUMENTS 5,361,211 A   11/1994   Lee et al.
9,334,629 B2   5/2016   Mueller
(Continued)

FOREIGN PATENT DOCUMENTS

CN    202827257 U    3/2013
EP    3584374 A1    12/2019
(Continued)

OTHER PUBLICATIONS

Hydraulic accumulator, Apr. 23, 2022, Wikipedia. https://web.archive.org/web/20200423223658/https://en.wikipedia.org/wiki/Hydraulic_accumulator (Year: 2022).*

(Continued)

*Primary Examiner* — Tiffany P Young
*Assistant Examiner* — Michael T Dowling
(74) *Attorney, Agent, or Firm* — Fletcher Yoder, P.C.

(57) ABSTRACT

A system for reducing loader arm movement during operation of a work vehicle includes a sensor configured to capture data indicative of an angle of a loader arm of the vehicle relative to the vehicle chassis. A controller of the disclosed system is configured to control the operation of a valve of the vehicle such that fluid from a pump of the vehicle is supplied to first and second chambers of a fluid-driven actuator of the vehicle to initiate a ride control mode.

(Continued)

Moreover, the controller is configured to monitor the angle of the loader arm relative to the chassis based on the data captured by the sensor. In addition, the controller is configured to control the operation of the pump based on the monitored angle after the ride control mode has been initiated.

18 Claims, 4 Drawing Sheets

(51) Int. Cl.
    *E02F 9/22*         (2006.01)
    *F15B 13/042*     (2006.01)

(52) U.S. Cl.
    CPC .......... *E02F 9/2267* (2013.01); *E02F 9/2271* (2013.01); *F15B 13/042* (2013.01); *E02F 9/2285* (2013.01); *E02F 9/2296* (2013.01)

(58) Field of Classification Search
    USPC ........................................................ 701/50
    See application file for complete search history.

(56) References Cited

U.S. PATENT DOCUMENTS

| | | |
|---|---|---|
| 10,030,364 B2 | 7/2018 | Rosa Neto |
| 10,323,384 B2 | 6/2019 | Murugesan et al. |
| 2015/0322648 A1 | 11/2015 | Lee |
| 2018/0112375 A1* | 4/2018 | Greer .................... E02F 9/2225 |

FOREIGN PATENT DOCUMENTS

| | | | |
|---|---|---|---|
| GB | 2553504 A | | 3/2018 |
| JP | 2017077966 A | * | 4/2017 |
| WO | 2019/014472 A1 | | 1/2019 |

OTHER PUBLICATIONS

International Search Report and Written Opinion for PCT Application No. PCT/US2021/042197 dated Nov. 10, 2021 (10 pages).

* cited by examiner

SYSTEM AND METHOD FOR MAINTAINING LOADER ARM POSITION DURING THE OPERATION OF A WORK VEHICLE USING A RIDE CONTROL MODE

FIELD OF THE INVENTION

The present disclosure generally relates to work vehicles and, more particularly, to systems and methods for maintaining the position of a loader arm of a work vehicle relative to the ground during operation using a ride control mode.

BACKGROUND OF THE INVENTION

Work vehicles having loader arms, such as wheel loaders, skid steer loaders, backhoe loaders, compact track loaders, and the like, are a mainstay of construction work and industry. For example, wheel loaders typically include a pair of loader arms pivotably coupled to the vehicle's chassis that can be raised and lowered at the operator's command. As such, wheel loaders may include one or more hydraulic cylinders to raise and lower the loader arms. Moreover, the loader arms typically have an implement attached to their end, thereby allowing the implement to be moved relative to the ground as the loader arms are raised and lowered. For example, a bucket is often coupled to the loader arms, which allows the wheel loader to be used to carry supplies or particulate matter, such as gravel, sand, or dirt, around a worksite.

Wheel loaders typically do not typically include dampers or other suspension elements coupled between their axles and their chassis. This lack of suspension elements may incite vibrations or oscillations to various components of the wheel loader when the loader encounters bumps or other surface irregularities. For example, the implement and loader arms to oscillate or otherwise move up and down relative to the ground after the wheel loader encounters a bump. To reduce such movement, some wheel loaders include a hydraulic accumulator coupled to the hydraulic cylinder(s) that raise and lower the loader arms. In this respect, the accumulator acts as a shock absorber for the implement and loader arms. While such configurations provide adequate damping, the addition of the hydraulic accumulator and the associated valving and piping increases the overall complexity and cost associated with the hydraulic system of the work vehicle.

Accordingly, an improved system and method for maintaining loader arm position during the operation of a work vehicle would be welcomed in the technology. In particular, a system and method for maintaining loader arm position during the operation of a work vehicle that does not require a hydraulic accumulator to provide damping to the loader arms would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for reducing loader arm movement during operation of a work vehicle. The system includes a vehicle chassis, a loader arm pivotably coupled to the vehicle chassis, and a fluid-driven actuator coupled between the loader arm and the vehicle chassis, with the fluid-driven actuator defining first and second chambers. Additionally, the system includes a pump configured to supply fluid to the fluid-driven actuator and a valve configured to control a flow of the fluid from the pump to the first and second chambers of the fluid-driven actuator. Furthermore, the system includes a sensor configured to capture data indicative of an angle of the loader arm relative to the vehicle chassis and a controller communicatively coupled to the sensor. The controller, in turn, is configured to control an operation of the valve such that the fluid from the pump is supplied to the first and second chambers of the fluid-driven actuator to initiate a ride control mode. Moreover, the controller is configured to monitor the angle of the loader arm relative to the chassis based on the data captured by the sensor. In addition, the controller is configured to control an operation of the pump based on the monitored angle after the ride control mode has been initiated.

In another aspect, the present subject matter is directed to a method for reducing loader arm movement during operation of a work vehicle. The work vehicle, in turn, includes a fluid-driven actuator coupled between a loader arm and a chassis, with the fluid-driven actuator defining first and second chambers. Additionally, the work vehicle includes a pump configured to supply fluid to the fluid-driven actuator and a valve configured to control a flow of the fluid from the pump to the first and second chambers of the fluid-driven actuator. The method includes controlling, with one or more computing devices, an operation of the valve such that the fluid from the pump is supplied to the first and second chambers of the fluid-driven actuator to initiate a ride control mode. Furthermore, the method includes monitoring, with the one or more computing devices, an angle of the loader arm relative to the chassis based on received angle sensor data. Moreover, after the ride control mode has been initiated, the method includes controlling, with the one or more computing devices, an operation of the pump based on the monitored angle.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for maintaining loader arm position during the operation of a work vehicle (e.g., a front loader). Specifically, in several embodiments, the vehicle may include loader arms having first ends pivotably coupled to the chassis and second ends pivotably coupled to an implement (e.g., a bucket). A fluid-driven actuator(s) (e.g., a hydraulic lift cylinder(s)) having first and second chambers may be coupled between one of the loader arms and the chassis. In this respect, the actuator(s) may be configured to raise and lower the loader arms and the implement relative to the ground. Furthermore, the vehicle may include a pump configured to supply fluid (e.g., hydraulic oil) to the actuator(s). Additionally, the vehicle may include a valve configured to control the flow of the fluid from the pump to the first and second chambers of the actuator(s).

In accordance with aspects of the present subject matter, the controller may be configured to control the operation of the pump in a manner that maintains the position of the loader arms relative to the ground during operation of the vehicle. In general, when the vehicle encounters a bump or other surface irregularity, the loader arms and the implement may oscillate or otherwise move up and down relative to the ground. As such, a controller of the disclosed system may be configured to control the operation of the valve such that the fluid from the pump is simultaneously supplied to the first and second chambers of the actuator(s) to initiate a ride control mode. For example, in one embodiment, the ride control mode may be initiated when the vehicle has exceeded a predetermined ground speed and/or the hydraulic system of the vehicle has exceeded a predetermined pressure. After the ride control mode has been activated, the controller may be configured to monitor the angle of the loader arms relative to the chassis based on received sensor data. Thereafter, the controller may be configured to control the operation of the pump based on the monitored angle to maintain the loader arms within a predetermined range of angles relative to the chassis. For example, when a bump encountered by the vehicle causes monitored angle of the loader arms to deviate from the predetermined range of angles, the controller may instruct to the pump to increase or decrease the pressure of the fluid supplied to the actuator(s) to return the angles of the loader arms to the predetermined range.

By controlling the operation of the pump to maintain the angles of the loader arms relative to the chassis within the predetermined range of angles when the vehicle encounters a bump/surface irregularity, the position of the loader arms during operation of the vehicle is maintained relative to the ground. Moreover, by allowing the angles of the loader arms to move within the predetermined range, other components of the vehicle, such as the chassis and cab, are permitted to move up and down relative to the ground when the vehicle encounters a bump/surface irregularity without the position of the implement coupled to the loader arms changing relative to the ground. As such, there is no need for a hydraulic accumulator (and the associated valving and piping) to maintain the position of the loader arms relative to the ground, which reduces the complexity and cost of the vehicle.

Figure 1:
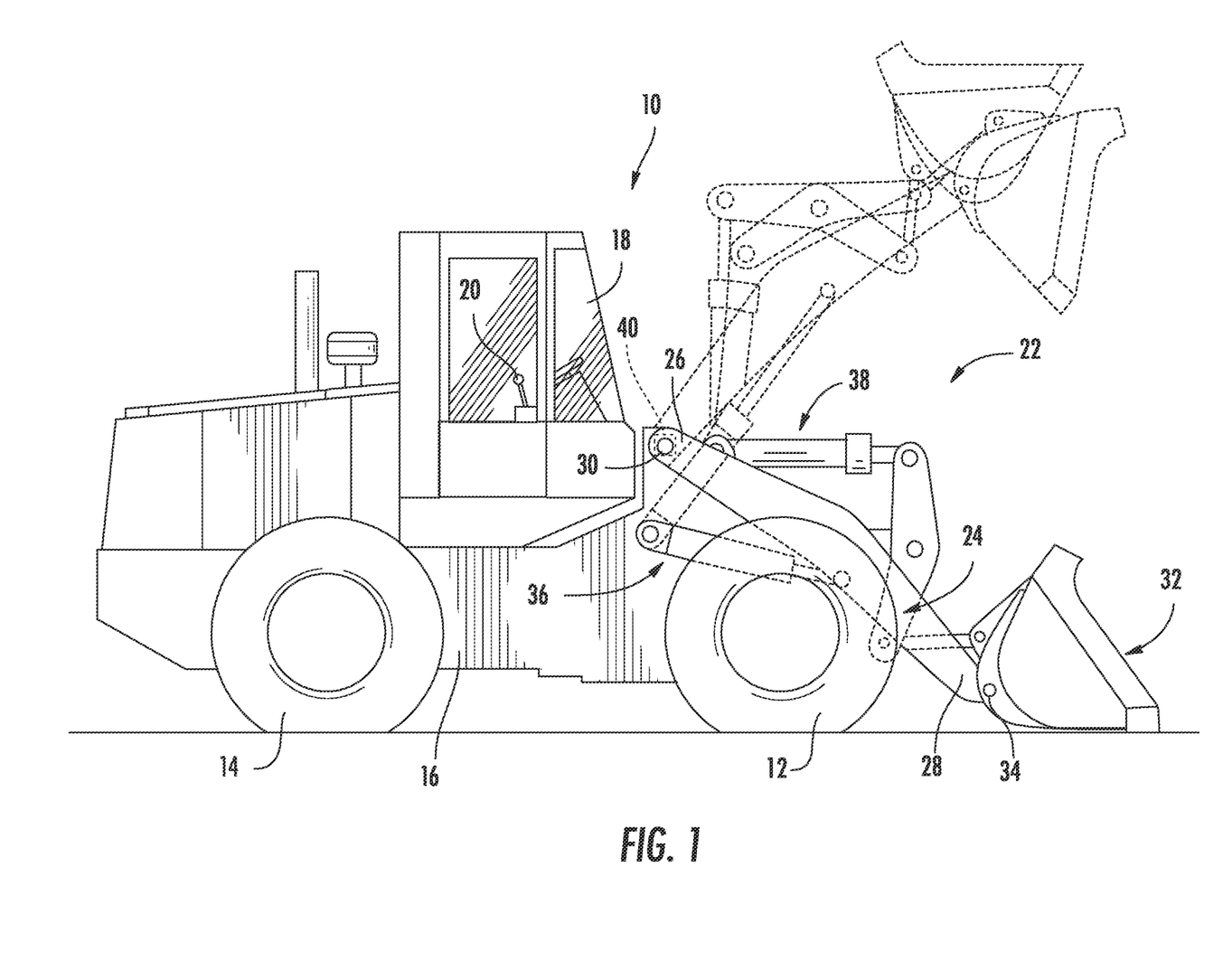
FIG. 1 illustrates a side view of one embodiment of a work vehicle in accordance with aspects of the present subject matter.

Referring now to the drawings, FIG. 1 illustrates a side view of one embodiment of a work vehicle 10. As shown, the work vehicle 10 is configured as a wheel loader. However, in other embodiments, the work vehicle 10 may be configured as any other suitable work vehicle known in the art, such as any other work vehicle including movable loader arms (e.g., any other type of front loader, such as skid steer loaders, backhoe loaders, compact track loaders, and/or the like).

As shown in FIG. 1, the work vehicle 10 includes a pair of front wheels 12, a pair or rear wheels 14, and a chassis 16 coupled to and supported by the wheels 12, 14. An operator's cab 18 may be supported by a portion of the chassis 16 and may house various control or input devices (e.g., levers, pedals, control panels, buttons and/or the like) for permitting an operator to control the operation of the work vehicle 10. For instance, as shown in FIG. 1, the work vehicle 10 includes one or more control levers 20 for controlling the operation of one or more components of a lift assembly 22 of the work vehicle 10.

As shown in FIG. 1, the lift assembly 22 includes a pair of loader arms 24 (one of which is shown) extending lengthwise between a first end 26 and a second end 28. In this respect, the first ends 26 of the loader arms 24 may be pivotably coupled to the chassis 16 at pivot joints 30. Similarly, the second ends 28 of the loader arms 24 may be pivotably coupled to a suitable implement 32 of the work vehicle 10 (e.g., a bucket, fork, blade, and/or the like) at pivot joints 34. In addition, the lift assembly 22 also includes a plurality of fluid-driven actuators for controlling the movement of the loader arms 24 and the implement 30. For instance, the lift assembly 22 may include a pair of hydraulic lift cylinders 36 (one of which is shown) coupled between the chassis 16 and the loader arms 24 for raising and lowering the loader arms 24 relative to the ground. Moreover, the lift assembly 22 may include a pair of hydraulic tilt cylinders 38 (one of which is shown) for tilting or pivoting the implement 32 relative to the loader arms 24.

Furthermore, in several embodiments, the work vehicle 10 may include an angle sensor 40. In general, the angle sensor 40 may be configured to capture data indicative of the angle or orientation of the loader arms 24 relative to the chassis 16. For example, in one embodiment, the angle sensor 40 may correspond to a potentiometer positioned between the loader arms 24 and the chassis 16, such as within one of the pivot joints 34. In such an embodiment, as the loader arms 24 and the implement 32 are raised and lowered relative to the ground, the voltage output by the angle sensor 40 may vary, with such voltage being indicative of the angle of the loader arms 24 relative to the chassis 16. However, in other embodiments, the angle sensor 40 may correspond to any other suitable sensor(s) and/or sensing device(s) configured to capture data associated with the angle or orientation of the loader arms 24 relative to the chassis 16, such as a Hall Effect sensor.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration. For example, the work vehicle 10 was described above as including a pair of lift cylinders 36 and a pair of tilt cylinders 38. However, in other embodiments, the work vehicle 10 may, instead, include any number of lift cylinders 36 and/or tilt cylinders 38, such as by only including a single lift cylinder 36 for controlling the movement of the loader arms 24 and/or a single tilt cylinder 38 for controlling the movement of the implement 32.

Figure 2:
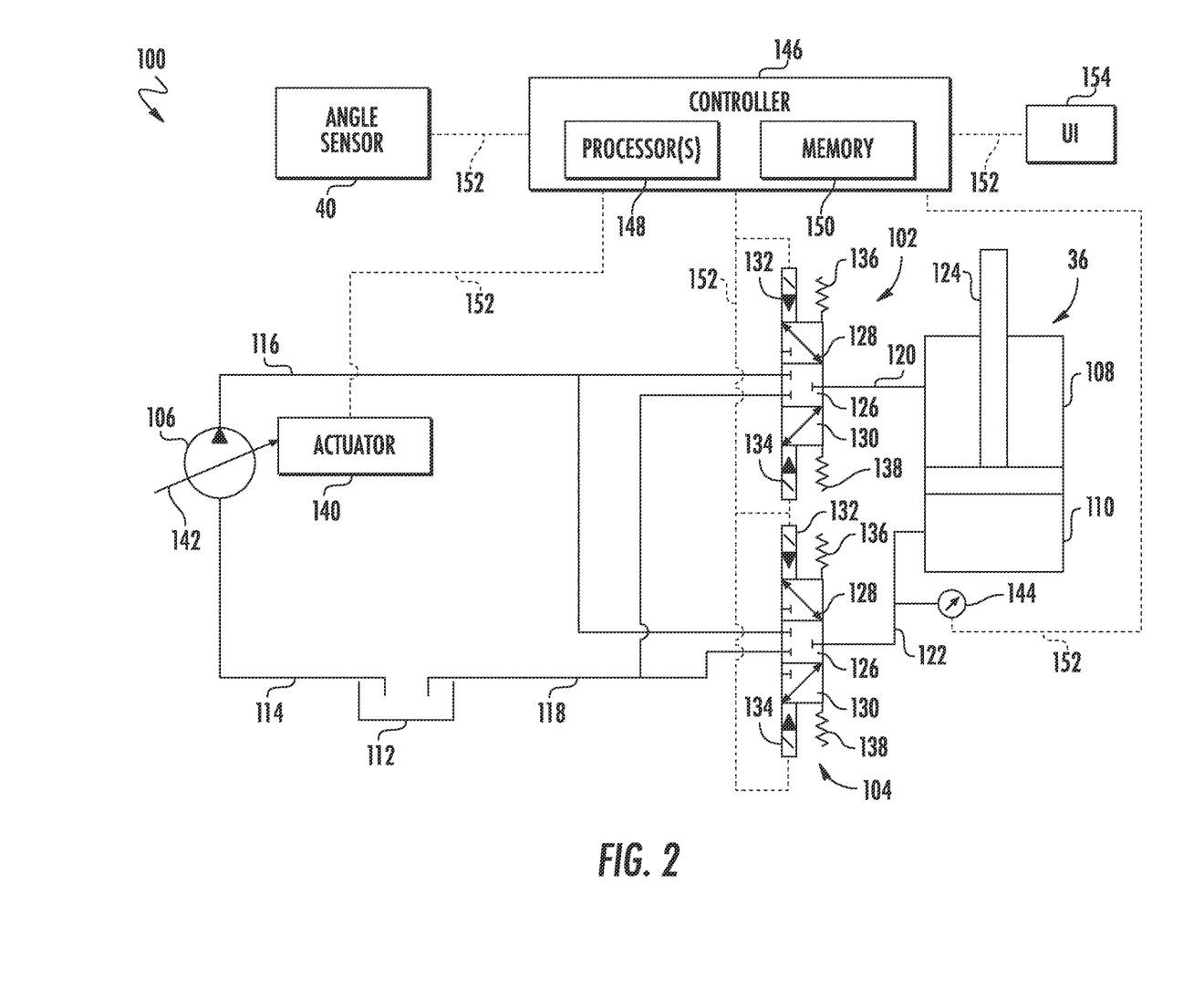
FIG. 2 illustrates a schematic view of one embodiment of a system for reducing loader arm movement during the operation of a work vehicle in accordance with aspects of the present subject matter.

Referring now to FIG. 2, a schematic view of one embodiment of a system 100 for maintaining loader arm position during the operation of a work vehicle is illustrated in accordance with aspects of the present subject matter. In general, the system 100 will be described herein with reference to the work vehicle 10 described above with reference to FIG. 1. However, it should be appreciated by those of ordinary skill in the art that the disclosed system 100 may generally be utilized with work vehicles having any other suitable vehicle configuration. It should also be appreciated that, for purposes of illustration, hydraulic connections between components of the system 100 are shown in solid lines while electrical connection between components of the system 100 are shown in dashed lines.

As shown, the system 100 may include various components of the hydraulic system of the vehicle 10 for regulating the supply of hydraulic fluid to the lift cylinders 36 (only one of which is shown), thereby allowing the movement of the loader arms 24 and the implement 32 to be controlled. Specifically, in several embodiments, the system 100 may include first and second control valves 102, 104 configured to regulate the supply of hydraulic fluid between a pressurized fluid source, such as a pump 106, and the lift cylinders 36. For instance, as shown in FIG. 2, the first valve 102 is configured to the regulate the supply of hydraulic fluid between the pump 106 and a rod-side chamber 108 (e.g., a first chamber) of each lift cylinder 34. Similarly, as shown in FIG. 2, the second valve 104 is configured to the regulate the supply of hydraulic fluid between the pump 106 and a cap-side chamber 110 (e.g., a second chamber) of each lift cylinder 36. The pump 106 may, in turn, be in fluid communication with both a fluid tank or reservoir 112 (via a pump line 114) and the control valves 102, 104 (e.g., via a supply line 116) to allow hydraulic fluid stored within the fluid tank 112 to be pressurized and supplied to the control valves 102, 104. The control valves 102, 104 may also be in fluid communication with the fluid tank 112 (e.g., via a return line 118) to allow hydraulic fluid to be returned to the tank 112. Additionally, as shown in FIG. 2, first and second actuator lines 120, 122 may be provided to fluidly couple the control valves 102, 104 to the lift cylinders 36, thereby allowing pressurized hydraulic fluid to be transferred between the control valves 102, 104 and the lift cylinders 36. Specifically, the first actuator line 120 may be fluidly coupled to the rod-side chambers 108 of the lift cylinders 36 and a second actuator line 122 may be fluidly coupled to the cap-side chambers 110 of the lift cylinders 36. As such, providing fluid to the cap-side chambers 110 of the lift cylinders 36 may cause associated piston rods 124 of each cylinder 36 to extend. Conversely, providing fluid to the rod-side chambers 108 of the lift cylinders 36 may cause the piston rods 124 to retract. In one embodiment, extension of the piston rods 124 may raise the loader arms 24 and the implement 32 relative to the ground, while retraction of the piston rods 124 may lower the loader arms 24 and the implement 32 relative to the ground.

As shown in the illustrated embodiment, the control valves 104, 104 are configured as a pass-through three-position/four-way valves. In such an embodiment, the control valves 102, 104 may include a neutral or first position 126 corresponding to a closed position at which fluid flow between the supply/return lines 116/118 and the first and second actuator lines 120, 122 is blocked or cut-off. A second position 128 of the first control valve 102 may be configured to facilitate fluid flow between the supply line 116 and the rod-side chambers 108 of the lift cylinders 36 (e.g., via the first actuator line 120). Similarly, a second position 128 of the second control valve 104 may be configured to facilitate fluid flow between the supply line 116 and the cap-side chambers 110 of the lift cylinders 36 (e.g., via the second actuator line 122). Furthermore, a third position 130 of the first control valve 102 may be configured to facilitate fluid flow between the rod-side chambers 108 of the lift cylinders 36 and the return line 118 (e.g., via the first actuator line 120). Similarly, a third position 130 of the second control valve 104 may be configured to facilitate fluid flow between the cap-side chambers 110 of the lift cylinders 36 and the return line 118 (e.g., via the second actuator line 122).

In the illustrated embodiment, each control valve 102, 104 includes a first actuator 132 configured to drive the control valve 102, 104 to the second position 128 and a second actuator 134 configured to drive the control valve 102, 104 to the third position 130. In the illustrated embodiment, the first and second actuators 132, 134 correspond to electronically controlled actuators (e.g., solenoid actuators) configured to move the control valves 102, 104 in response to receiving a control signal (e.g., an electric current) from a controller 146 of the system 100. In addition, each control valve 102, 104 may include biasing elements 136, 138 (e.g., springs) configured to urge the control valves 102, 104 toward the first position 126. Accordingly, the controller 146 may be configured to apply an electric current to the first actuators 132 to drive the control valves 102, 104 to the second position 128 against the bias of the associated biasing element 132. Similarly, the controller 146 may also be configured to apply also an electric current to the second actuators 134 to drive the control valves 102, 104 to the third position 130 against the bias of the associating biasing element 138. However, if no electric current is applied to either actuator 132, 134, the biasing elements 136, 138 may drive the control valves 102, 104 to the first position 126, thereby blocking fluid flow between the supply and return lines 116, 118 and the lift cylinders 36.

In several embodiments, the pump 106 may be configured as variable displacement pump configured to supply a source pressure across a given pressure range. Specifically, the pump 106 may supply pressurized hydraulic fluid within a range bounded by a minimum source pressure and a maximum source pressure capability of the variable displacement pump. In this respect, a swash plash plate 140 may be configured to be actively controlled based by the controller 146 to adjust the position of a swash plate 142 of the pump 106, as necessary, to ensure that the source pressure of the pump 106 matches the load applied to the hydraulic system of the vehicle 10. However, in other embodiments, the pump 106 may correspond to any other suitable pressurized fluid source. Moreover, the operation of the pump 106 may be controlled in any other suitable manner. For example, as will be described below, the position of a swash plate 142 may be adjusted may be adjusted mechanically based on the pressure of fluid supplied to the pump 106 via a load sensing line.

Furthermore, as shown in FIG. 2, the system 100 includes a pressure sensor 144. Specifically, in several embodiments, the pressure sensor 144 may be configured to capture data indicative of the pressure of the fluid supplied to and/or present within the cap-side chamber 110 (e.g., load-holding chamber) of the one of the lift cylinders 36. As will be described below, the data captured by the pressure sensor 144 may be used to control the operation of the pump 106. As shown, the pressure sensor 144 may be provided in fluid communication with the cap-side chamber 110. For example, in the illustrated embodiment, the pressure sensor 144 is fluidly coupled to the second actuator line 122. However, in alternative embodiments, the pressure sensor 144 may be fluidly coupled to the cap-side chamber 110 in any other suitable manner and/or fluidly coupled to the rod-side chamber 108 of one of the lift cylinders 36.

In accordance with aspects of the present subject matter, the system 100 may generally include a controller 146 configured to electronically control the operation of one or more components of the work vehicle 10, such as the various hydraulic components of the work vehicle 10. In general, the controller 146 may comprise any suitable processor-based device known in the art, such as a computing device or any suitable combination of computing devices. Thus, in several embodiments, the controller 146 may include one or more processor(s) 148 and associated memory device(s) 150 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 150 of the controller 146 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 150 may generally be configured to store suitable computer-readable instructions that, when implemented by the processor(s) 148, configure the controller 146 to perform various computer-implemented functions.

In addition, the controller 146 may also include various other suitable components, such as a communications circuit or module, one or more input/output channels, a data/control bus and/or the like. In addition, the controller 146 may also include various other suitable components, such as a communications circuit or module, a network interface, one or more input/output channels, a data/control bus and/or the like, to allow controller 146 to be communicatively coupled to any of the various other system components described herein (e.g., the angle sensor 40, the first valve 102, the second valve 104, the swash plate actuator 140, and pressure sensor 144). For instance, as shown in FIG. 2, a communicative link or interface 152 (e.g., a data bus) may be provided between the controller 146 and the components 40, 102, 104, 140, 144 to allow the controller 146 to communicate with such components 40, 102, 104, 140, 144 via any suitable communications protocol (e.g., CANBUS).

The controller 146 may correspond to an existing controller of the work vehicle 10 or the controller 146 may correspond to a separate processing device. For instance, in one embodiment, the controller 146 may form all or part of a separate plug-in module that may be installed within the work vehicle 10 to allow for the disclosed system and method to be implemented without requiring additional software to be uploaded onto existing control devices of the vehicle 10.

Moreover, the functions of the controller 146 may be performed by a single processor-based device or may be distributed across any number of processor-based devices, in which instance such devices may be considered to form part of the controller 146. For instance, the functions of the controller 146 may be distributed across multiple application-specific controllers, such as an engine controller, a transmission controller, and/or the like.

Furthermore, in one embodiment, the system 100 may also include a user interface 154. More specifically, the user interface 154 may be configured to receive inputs (e.g., inputs associated with a predetermined angle range for the loader arms 24) from the operator. As such, the user interface 154 may include one or more input devices (not shown), such as touchscreens, keypads, touchpads, knobs, buttons, sliders, switches, mice, microphones, and/or the like, which are configured to receive user inputs from the operator. The user interface 154 may, in turn, be communicatively coupled to the controller 146 via the communicative link 152 to permit the received inputs to be transmitted from the user interface 154 to the controller 146. In addition, some embodiments of the user interface 154 may include one or more feedback devices (not shown), such as display screens, speakers, warning lights, and/or the like, which are configured to provide feedback from the controller 146 to the operator. In one embodiment, the user interface 154 may be mounted or otherwise positioned within the cab 18 of the vehicle 10. However, in alternative embodiments, the user interface 154 may mounted at any other suitable location.

Figure 3:
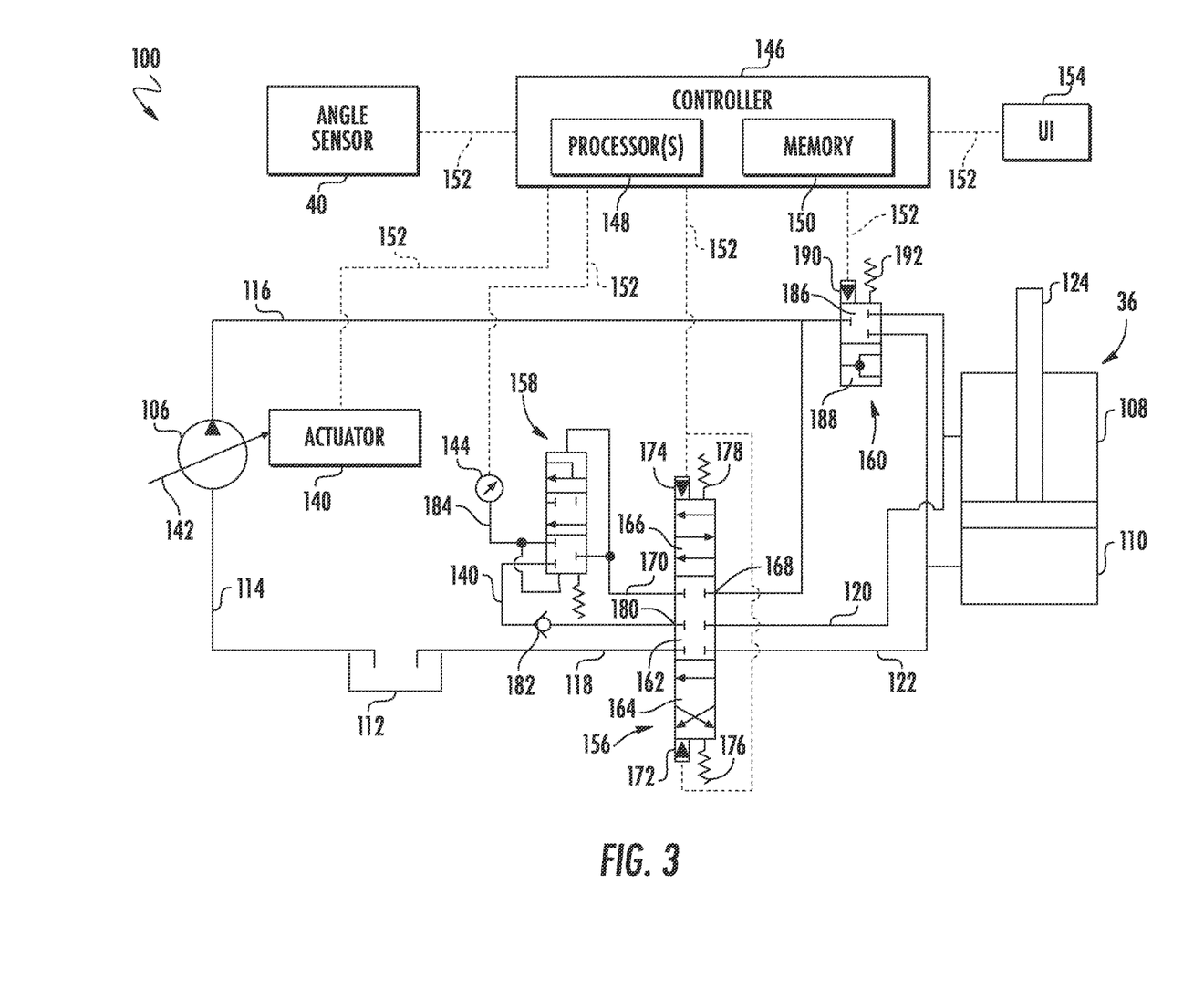
FIG. 3 illustrates a schematic view of another embodiment of a system for maintaining loader arm position during the operation of a work vehicle in accordance with aspects of the present subject matter.

Referring now to FIG. 3, a schematic view of another embodiment of the system 100 for maintaining loader arm position during the operation of a work vehicle is illustrated in accordance with aspects of the present subject matter. In general, the embodiment of the system 100 depicted in FIG. 3 is configured similarly to the embodiment of the system 100 depicted in FIG. 2. For example, like the system 100 illustrated in FIG. 2, the system 100 shown in FIG. 3 includes various components of the hydraulic system of the work vehicle 10, such as the lift cylinders 36, the pump 106, the fluid tank 112, and the lines 114, 116, 118, 120, 122, as well as the angle sensor 40, the swash plate actuator 140, the controller 146, and the user interface 154. However, unlike the system 100 of FIG. 2, the system 100 depicted in FIG. 3 does not include the first and second control valves 102, 104. Instead, as shown in FIG. 3, the system 100 includes a main control valve 156, a load bypass valve 158, and a ride control valve 160.

In several embodiments, the main control valve 156 may be configured to regulate the supply of hydraulic fluid between a pressurized fluid source, such as the pump 106, and the lift cylinders 36. Specifically, the pump 106 may be in fluid communication with the main control valve 156 (e.g., via supply line 116) to allow hydraulic fluid stored within the fluid tank 112 to be pressurized and supplied to the main control valve 156. The main control valve 156 is also in fluid communication with the fluid tank 112 (e.g., via a return line 118) to allow hydraulic fluid to be returned to the tank 112. Additionally, as shown in FIG. 3, the first and second actuator lines 120, 122 may fluidly couple the main control valve 156 to the lift cylinders 36, thereby allowing pressurized hydraulic fluid to be transferred between the main control valve 156 and the lift cylinders 36. Specifically, the first actuator line 120 may fluidly couple the main control valve 156 to a rod-side chambers 108 (e.g., the first chamber) of the lift cylinders 36. Similarly, the second actuator line 122 may fluidly couple the main control valve 156 to the cap-side chambers 110 (e.g., the second chamber) of the lift cylinders 36.

As shown in the illustrated embodiment, the main control valve 156 is configured as a pass-through three-position/four-way valve. In such an embodiment, the main control valve 156 may include a neutral or first position 162 corresponding to a closed position at which fluid flow between the supply/return lines 116/118 and the first and second actuator lines 120, 122 is blocked or cut-off. A second position 164 of the main control valve 156 may be configured to facilitate fluid flow between the supply line 116 and the cap-side chambers 110 of the lift cylinders 36 (e.g., via the second actuator line 122) and between the return line 118 and the rod-side chambers 108 of the lift cylinders 36 (e.g., via the first actuator line 120) to extend the lift cylinders 36. A third position 166 of the main control valve 156 may be configured to facilitate fluid flow between the supply line 116 and the rod-side chambers 108 of the lift cylinders 36 and between the return line 118 and the cap-side chambers 110 of the lift cylinders 36 to retract the lift cylinders 36. In the illustrated embodiment, the main control valve 156 includes a pass-through port 168 that fluidly couples the supply line 116 to an intermediate supply line 170 when the main control valve 156 is located at the second and third positions 164, 166.

In the illustrated embodiment, the main control valve 156 also includes a first actuator 172 configured to drive the main control valve 156 to the second position 164 and a second actuator 174 configured to drive the main control valve 156 to the third position 166. In the illustrated embodiment, the first and second actuators 172, 174 correspond to electronically-controlled actuators (e.g., solenoid actuators) configured to move the main control valve 156 in response to receiving a control signal (e.g., an electric signal) from the controller 146 (e.g., via the communicative link 152). In addition, the main control valve 156 may include biasing elements 176, 178 (e.g., springs) configured to urge the main control valve 156 toward the first position 162. Accordingly, the controller 146 may be configured to apply an electric current to the first actuator 172 to drive the main control valve 156 to the second position 164 against the bias of the associated biasing element 176. Similarly, the controller 146 may be configured to apply an electric current to the second actuator 174 to drive the main control valve 156 to the third position 166 against the bias of the associating biasing element 178. However, if no electric current is applied to either actuator 172, 174, the biasing elements 176, 178 may drive the main control valve 156 to the first position 162, thereby blocking fluid flow between the supply and return lines 116, 118 and the lift cylinders 36.

As shown in FIG. 3, the intermediate supply line 170 fluidly couples the pass-through port 168 of the main control valve 156 to an inlet port 180 of the main control valve 156. In several embodiments, one or more auxiliary or secondary valves may be provided in-line or otherwise in fluid communication with the intermediate supply line 170. For instance, in the illustrated embodiment, a load bypass valve 158 (e.g., a pilot-operated proportional valve) is provided in-line with the intermediate supply line 170 to regulate the pressure of the hydraulic fluid supplied to the inlet port 180 of the main control valve 156. In one embodiment, the load bypass valve 158 may be configured as a load sensing valve, such as a pre-compensation or post-compensation valve, that is configured to supply the highest load through the intermediate supply line 170 to the inlet port 180. Moreover, a check valve 182 may be provided in-line with the intermediate supply line 170 at a location downstream of the load bypass valve 158 (and upstream of the inlet port 180) to prevent back-flow from the inlet port 180. In addition, as shown in FIG. 3, a load sensing line 184 may fluidly couple the load bypass valve 158 to the pressure sensor 144, thereby allowing the pressure sensor 144 to capture data indicative of the pressure of the fluid supplied to the lift cylinders 36 by the main control valve 158.

In another embodiment, the load sensing line 184 may be used to mechanically control the operation of the pump 106. For example, in such an embodiment, the load sensing line 184 may be coupled to the pump 106, with a valve (not shown) in place of the actuator 140. As such, the controller 146 may be configured to control the operation of the valve to adjust the pressure of the fluid supplied to the pump 106 by the load sensing line 184, thereby adjusting the swash plate 142 of the pump 106 in a manner that varies the pressure of fluid discharged by the pump 106 into the supply line 116.

In accordance with aspects of the present subject matter, system 100 may include a ride control valve 160. As will be described below, in certain instances, the supply line 116 may be simultaneously fluidly couple to the rod-side and cap-side chambers of the lift cylinders 36 to initiate a ride control mode of the vehicle 10. However, the main control valve 156 shown in FIG. 3 is unable to do so. As such, in several embodiments, the ride control valve 160 may be configured to selectively fluidly couple the supply line 116 to the rod-side and cap-side chambers of the lift cylinders 36 (e.g., via the first and second actuator lines 120, 122). In this respect, the ride control valve 160 may be provided in parallel with the main control valve 156. In the embodiment shown in FIG. 3, the ride control valve 160 and the main control valve 156 are separate valves. However, in alternative embodiments, the ride control valve 160 may be integrated into or otherwise correspond to a portion the main control valve 156.

In the illustrated embodiment, the ride control valve 160 corresponds to a two-position/three-way valve. For example, the ride control valve 160 includes a neutral or first position 186 corresponding to a closed position at which fluid flow between the supply line 116 and the first and second actuator lines 120, 122 is blocked or cut-off an open/activated. Additionally, the ride control valve 160 includes a ride control mode or second position 188 at which the supply line 116 is in fluid communication with the first and second actuator lines 120, 122. As such, when the ride control valve 160 is disposed at its first or neutral position 186, the flow of pressurized fluid from the supply line 116 to the lift cylinders 36 is controlled by the main control valve 156. However, when the ride control valve 160 is moved to its second or ride control position 188, the supply line 116 is fluidly coupled to the first and second actuator lines 120, 122, thereby allowing pressurized fluid from the supply line 116 to bypass the main control valve 156 and be simultaneously supplied to the rod-side and cap-side chambers of the lift cylinders 36.

As shown in the illustrated embodiment, the ride control valve 160 is configured as a solenoid-activated valve. As a result, the ride control valve 160 includes an electronically controlled actuator 190 configured to be automatically controlled by the controller 146 (e.g., via control signals provided through communicative link 152) to actuate the valve 160 to its second or ride control mode position 188. In addition, as shown in FIG. 3, the ride control valve 160 includes a biasing element 192 (e.g., a spring) configured to bias the valve 160 towards its first or neutral position 186. In such an embodiment, when it is desired to initiate the rode control mode, the controller 146 may be configured to transmit a suitable control signal to the actuator 190 to cause the ride control valve 160 to be actuated to its second or ride control mode position 188.

Figure 4:
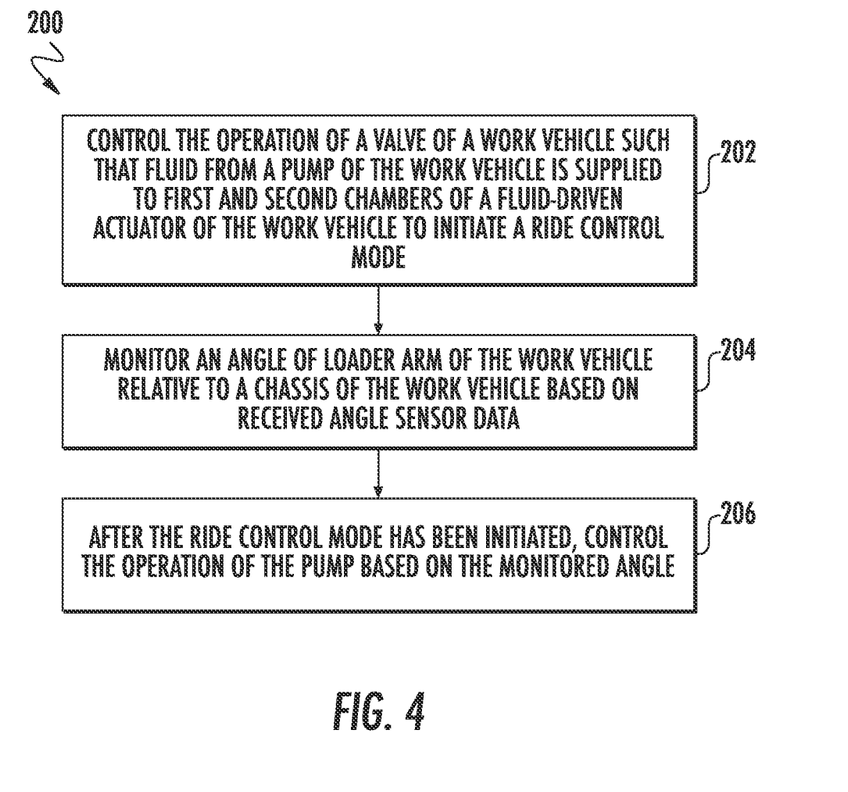
FIG. 4 illustrates a flow diagram of one embodiment of a method for maintaining loader arm position during the operation of a work vehicle in accordance with aspects of the present subject matter.

Referring now to FIG. 4, a flow diagram of one embodiment of a method 200 for maintaining loader arm position during operation of a work vehicle is illustrated in accordance with aspects of the present subject matter. In general, the method 200 will be described herein with reference to the work vehicle 10 and the system 100 described above with reference to FIGS. 1-3. However, it should be appreciated by those of ordinary skill in the art that the disclosed method 200 may generally be implemented with any work vehicle having any suitable vehicle configuration and/or within any system having any suitable system configuration. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 4, at (202), the method 200 may include controlling, with one or more computing devices, the operation of a valve of a work vehicle such that fluid from a pump of the work vehicle is supplied to first and second chambers of a fluid-driven actuator of the work vehicle to initiate a ride control mode. Specifically, in several embodiments, the controller 146 may be configured to control the operation of one or more valves in the hydraulic system of the work vehicle 10 to fluidly coupled the rod-side chambers 108 and the cap-side chambers 110 of the lift actuators 36 to the pump 106. Once the rod-side and the cap-side chambers 108, 110 of the lift actuators 36 are both fluidly coupled to the pump 106, pressurized hydraulic fluid from the pump 106 may be simultaneously supplied to both chambers 108, 110 of each lift actuator 36, thereby placing the work vehicle 10 in a ride control mode.

In general, the vehicle 10 is in the ride control mode when the valve(s) of vehicle 10 are actuated such that the fluid from the pump 106 is simultaneously supplied to the both chambers 108, 110 of the lift actuators 36. Simultaneously providing pressurized fluid from the pump 106 to both chambers 108, 110 of the lift actuators 36 allows the pressurized fluid to act on both sides of the associated pistons, thereby maintaining the position of the rods 124 and, thus, preventing the movement of the loader arms 24 relative to the chassis 16. As will be described in below, when the work vehicle 10 is in the ride control mode, the operation of the pump 106 may be controlled such that the pressure of the fluid supplied to both chambers 108, 110 of the lift actuators 36 maintains the position of the loader arms 24 relative to the ground when the vehicle 10 encounters a bump/surface irregularity.

In one embodiment, the controller 146 may be configured to control the operation of the first and second control valves 102, 104 to place the work vehicle in the ride control mode. More specifically, in the embodiment of the system 100 shown in FIG. 2, the first valve 102 is configured to the regulate the supply of hydraulic fluid between the pump 106 and the rod-side chambers 108 of the lift cylinders 34. Similarly, the second valve 104 is configured to the regulate the supply of hydraulic fluid between the pump 106 and the cap-side chambers 110 of the lift cylinders 36. In this respect, when it is desired to place the vehicle 10 in the ride control mode, the controller 146 may transmit control signals to the first actuators 132 of the first and second control valves 102, 104. Upon receipt of such control signals, the first actuators 132 may drive the control valves 102, 104 to the second position 128, thereby fluidly coupling the supply line 116 (and the pump 106) to the rod-side and cap-side chambers 108, 110 of the lift actuators 36.

In another embodiment, the controller 146 may be configured to control the operation of the ride control valve 160 to place the work vehicle in the ride control mode. More specifically, in the embodiment of the system 100 shown in FIG. 3, the ride control valve 160 is configured to the regulate the supply of hydraulic fluid between the pump 106 and the rod-side chambers 108 and the cap-side chambers 110 of the lift cylinders 34. In this respect, when it is desired to place the vehicle 10 in the ride control mode, the controller 146 may transmit control signals to the actuator 190 of the ride control valve 160. Upon receipt of such control signal, the actuator 190 may drive the ride control valve 160 to the second position 128, thereby fluidly coupling the supply line 116 (and the pump 106) to the rod-side and cap-side chambers 108, 110 of the lift actuators 36.

The controller 146 may be configured to control the operation of the valve(s) of the vehicle 10 to initiate the ride control mode based on any suitable input. For example, in one embodiment, the controller 146 may be configured to initiate the ride control mode based on a pressure within the hydraulic system of the vehicle 10. Specifically, as described above, a pressure sensor 144 may be configured to capture data indicative of the pressure of the fluid supplied to or within the lift actuators 36 (e.g., the load-bearing chambers or the cap-side chambers 110 of the lift actuators 36). In this respect, as the vehicle 10 is operated, the controller 146 may receive the captured pressure data from the pressure sensor 144 (e.g., via the communicative link 152). The controller 146 may be configured to process and/or analyze the received pressure data to determine or estimate the pressure of the fluid within the lift actuators 36. Thereafter, when the determined pressure exceeds a predetermined pressure value, the controller 146 may control the operation of the valve(s) to initiate the ride control mode. In another embodiment, the controller 146 may initiate the ride control when the monitored pressure exceeds the predetermined pressure valve and the ground speed of the work vehicle 10 has exceeded a predetermined ground speed value (e.g., two miles per hour). In a further embodiment, the controller 146 may initiate the ride control upon receipt of an input (e.g., via the user interface 154) from the operator of the vehicle 10.

Additionally, at (204), the method 200 may include monitoring, with the one or more computing devices, an angle of a loader arm of the work vehicle relative to a chassis of the work vehicle based on received angle sensor data. For example, as described above, the vehicle 10 may include an angle position sensor 40 configured to capture data indicative of the angle of the loader arms 24 relative to the chassis 16. In this respect, as the vehicle 10 is operated, the controller 146 may receive the captured angle data from the angle sensor 40 (e.g., via the communicative link 152). Thereafter, the controller 146 may process and/or analyze the received pressure data to determine or estimate the angle or position of the loader arms 24 relative to the chassis 16.

Moreover, as shown in FIG. 4, at (206), after the ride control mode has been initiated, the method 200 may include controlling, with the one or more computing devices, the operation of the pump based on the monitored angle. For example, after the ride control mode has been initiated, the controller 146 may be configured to control operation of the pump 106 (e.g., via the swash plate actuator 140) based on the monitored angle of the loader arms 24. Specifically, during ride control mode, the controller 146 may be configured to transmit control signals to the swash plate actuator 142 (e.g., via the communicative link 152). Such control signals may, in turn, instruct the actuator 142 to control the operation of the pump 106 such that the pressure of the pressurized hydraulic fluid provided by the pump 106 to the lift cylinders 36 is adjusted. In one embodiment, the controller 146 may be configured to control operation of the pump 106 based on the monitored angle and the monitored pressure within lift cylinders 36 (e.g., the load-bearing chambers or cap-side chambers 110 of the lift cylinders 36). Furthermore, the pump 106 may be controlled independently of the valves 102, 104, 160 used initiate the ride control mode. That is, the controller 146 may adjust the pressure of hydraulic fluid provided by the pump 106 during the ride control mode by adjusting the operation of the pump 106 and without adjusting the operation of the valves 102, 104, 106.

When in the ride control mode, the controller 146 may be configured to control the operation of the pump 106 to reduce maintain the position of the loader arms 24 and the implement 32 relative to the ground when the vehicle 10 encounters bumps or other surface irregularities. In general, when the vehicle 10 encounters a bump/irregularity while traveling across a surface, the loader arms 24 and the implement 32 may begin to oscillate or otherwise move relative to the chassis 16. Such oscillations/movement may be uncomfortable for the operator in the cab 18. In this respect, when the loader arms 24 move relative to the chassis 16, the controller 146 may control the operation of pump 106 such that the position of the implement 32 relative to the ground is maintained. For example, after the ride control mode has been initiated, the controller 146 may be configured to compare the monitored angle of the loader arms 24 to a predetermined angle range. Thereafter, when the monitored angle of the loader arms 24 falls outside of the predetermined range, the controller 146 may be configured to control the operation of the pump 106 to increase pressure of the pressurized hydraulic fluid flow supplied to the lift actuators 36. For example, as indicated above, the increase in pressure may be based on the monitored angle and/or the monitored pressure. Such increased hydraulic fluid pressure may return to the monitored angle of the loader arms 24 to the predetermined angle range.

In some embodiments, the operator of the vehicle 10 may set the predetermined angle range. For example, the operator may select the predetermined angle range to provide the desired amount of loader arm movement reduction. As such, the operator may select or otherwise provide the desired angle range to the user interface 154. However, in alternative embodiments, the predetermined angle range may be set by the manufacturer.

Allowing angle of the loader arms 24 relative to the chassis 16 to move within the predetermined angle range may damp to the vibrations/oscillations of the vehicle 10 incited by the bumps/surface irregularities encountered by the vehicle 10. Specifically, as the chassis 12 moves relative to the loader arms 24 within the predetermined range, the chassis 12 and the cab 18 are permitted to move up and down over the bumps/surface irregularities, thereby dissipating the energy of such vibrations/oscillations. As such, the ride control mode of the vehicle 10 may simultaneously maintain the position of the loader arms 24 and the implement 32 relative to the ground, while allowing the chassis 12 and the cab 18 to move up and down relative to the ground as the vehicle 10 encounters bumps/surface irregularities, thereby improving the overall ride quality of the vehicle 10.

It is to be understood that the steps of the method 200 are performed by the controller 146 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 146 described herein, such as the method 200, is implemented in software code or instructions which are tangibly stored on a tangible computer readable medium. The controller 146 loads the software code or instructions via a direct interface with the computer readable medium or via a wired and/or wireless network. Upon loading and executing such software code or instructions by the controller 146, the controller 146 may perform any of the functionality of the controller 146 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for maintaining loader arm position during operation of a work vehicle, the system comprising:
   a vehicle chassis;
   a loader arm pivotably coupled to the vehicle chassis;
   a hydraulic actuator coupled between the loader arm and the vehicle chassis, the hydraulic actuator defining first and second chambers;
   a pump configured to supply fluid to the hydraulic actuator;
   a valve configured to control a flow of the fluid from the pump to the first and second chambers of the hydraulic actuator;

a sensor configured to capture data indicative of an angle of the loader arm relative to the vehicle chassis; and
a controller communicatively coupled to the sensor, the controller configured to:
control an operation of the valve such that the fluid from the pump is concurrently supplied to the first and second chambers of the hydraulic actuator to initiate a ride control mode;
monitor the angle of the loader arm relative to the chassis based on the data captured by the sensor; and
control an operation of the pump based on the monitored angle after the ride control mode has been initiated;
wherein the system does not comprise a hydraulic accumulator fluidly coupled to the hydraulic actuator.

2. The system of claim 1, wherein the controller is further configured to:
compare the monitored angle to a predetermined angle range; and
when the monitored angle falls outside of the predetermined angle range, control the operation of the pump such that the monitored angle is returned to the predetermined angle range.

3. The system of claim 1, wherein, when controlling the operation of the pump, the controller is further configured to control the operation of the pump such that a pressure of the fluid supplied by the pump is adjusted.

4. The system of claim 1, further comprising:
a pressure sensor configured to capture data indicative of a pressure of the fluid within one of the first or second chambers of the hydraulic actuator, the controller communicatively coupled to the pressure sensor, the controller further configured to monitor the pressure based on the data captured by the pressure sensor.

5. The system of claim 4, wherein the controller is further configured to control the operation of the pump based on the monitored pressure and the monitored angle of the loader arm.

6. The system of claim 4, wherein the controller is further configured to control the operation of the valve such that the fluid from the pump is concurrently supplied to the first and second chambers of the hydraulic actuator to initiate the ride control mode when the monitored pressure exceeds the predetermined minimum pressure.

7. The system of claim 6, wherein the controller is further configured to control the operation of the valve such that the fluid from the pump is concurrently supplied to the first and second chambers of the hydraulic actuator to initiate the ride control mode when a ground speed of the work vehicle exceeds a predetermined minimum ground speed and the monitored pressure exceeds the predetermined minimum pressure.

8. The system of claim 1, wherein the valve is configured to selectively permit and occlude flow of the fluid from the pump to the first and second chambers of the hydraulic actuator.

9. The system of claim 8, wherein the valve corresponds to a first valve, the system further comprising:
a second valve configured to control a flow of the fluid from the pump to the hydraulic actuator, the second valve being in parallel with the first valve.

10. The system of claim 1, wherein the valve comprises a first valve configured to selectively permit and occlude flow of the fluid from the pump to the first chamber of the hydraulic actuator and a second valve configured to selectively permit and occlude flow of the fluid from the pump to the second chamber of the hydraulic actuator.

11. The system of claim 1, wherein the pump and the valve are independently controllable.

12. A method for maintaining loader arm position during operation of a work vehicle, the work vehicle including a hydraulic actuator coupled between a loader arm and a chassis, the hydraulic actuator defining first and second chambers, the work vehicle further including a pump configured to supply fluid to the hydraulic actuator and a valve configured to control a flow of the fluid from the pump to the first and second chambers of the hydraulic actuator, wherein a hydraulic accumulator is not fluidly coupled to the hydraulic actuator, the method comprising:
controlling, with one or more computing devices, an operation of the valve such that the fluid from the pump is concurrently supplied to the first and second chambers of the hydraulic actuator to initiate a ride control mode;
monitoring, with the one or more computing devices, an angle of the loader arm relative to the chassis based on received angle sensor data; and
after the ride control mode has been initiated, controlling, with the one or more computing devices, an operation of the pump based on the monitored angle.

13. The method of claim 12, wherein controlling the operation of the pump comprises:
comparing, with the one or more computing devices, the monitored angle to a predetermined angle range; and
when the monitored angle falls outside of the predetermined angle range, controlling, with the one or more computing devices, the operation of the pump such that the monitored angle is returned to the predetermined angle range.

14. The method of claim 12, wherein controlling the operation of the pump comprises:
controlling, with the one or more computing devices, the operation of the pump such that a pressure of the fluid supplied by the pump is adjusted.

15. The method of claim 12, further comprising:
monitoring, with the one or more computing devices, a pressure of the fluid within one of the first or second chambers of the hydraulic actuator based on received pressure sensor data.

16. The method of claim 15, wherein controlling the operation of the pump comprises:
controlling, with the one or more computing devices, the operation of the pump based on the monitored pressure and the monitored angle of the loader arm.

17. The method of claim 15, wherein controlling the operation of the valve comprises:
controlling, with the one or more computing devices, the operation of the valve such that the fluid from the pump is concurrently supplied to the first and second chambers of the hydraulic actuator to initiate the ride control mode when the monitored pressure exceeds the predetermined minimum pressure.

18. The method of claim 17, wherein controlling the operation of the valve further comprises:
controlling, with the one or more computing devices, the operation of the valve such that the fluid from the pump is concurrently supplied to the first and second chambers of the hydraulic actuator to initiate the ride control mode when a ground speed of the work vehicle exceeds a predetermined minimum ground speed and the monitored pressure exceeds the predetermined minimum pressure.

* * * * *